United States Patent Office 2,990,436
Patented June 27, 1961

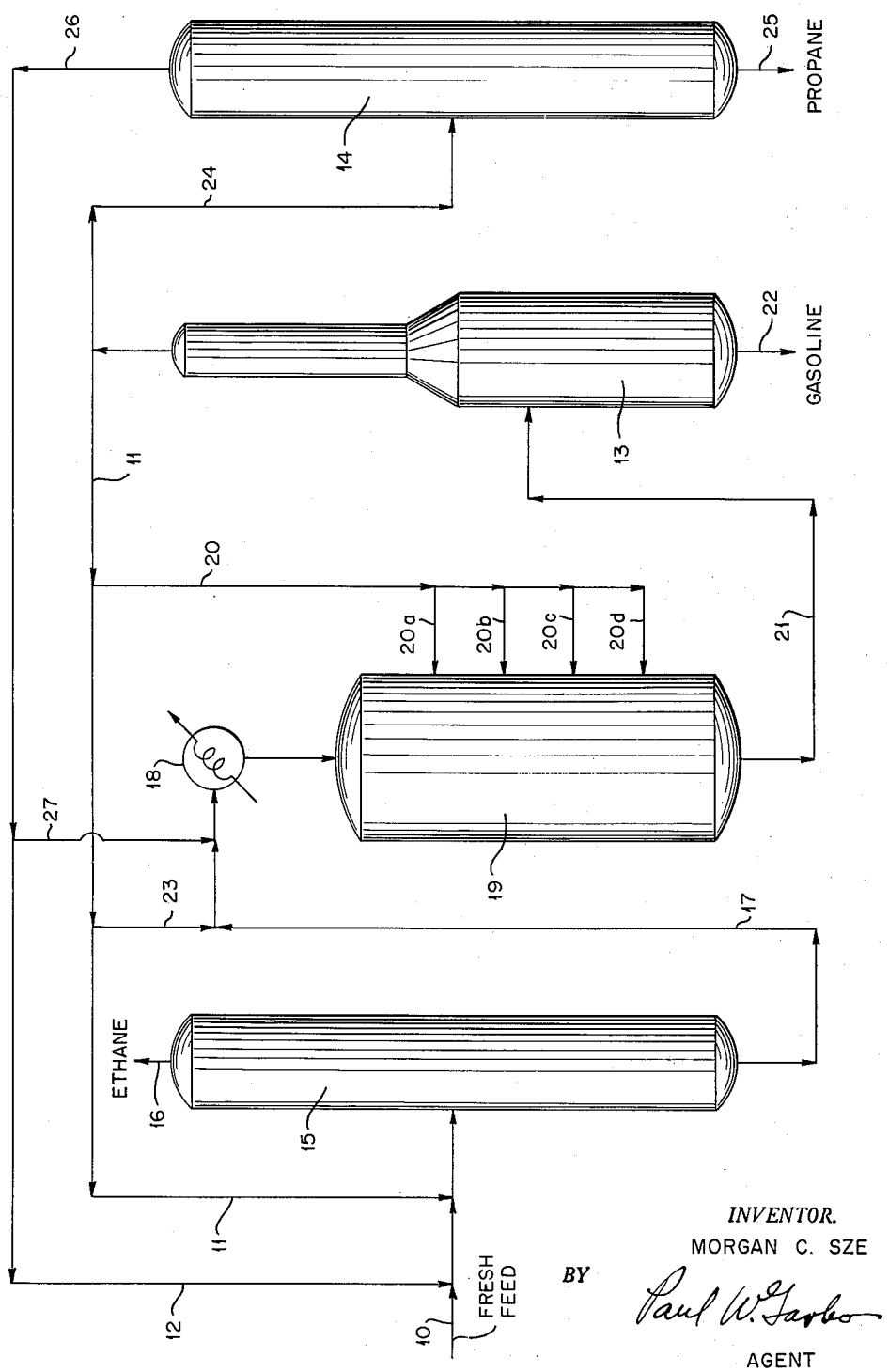

2,990,436
PROPYLENE POLYMERIZATION
Morgan C. Sze, Garden City, N.Y., assignor to Hydrocarbon Research, Inc., New York, N.Y., a corporation of New Jersey
Filed Mar. 12, 1958, Ser. No. 721,055
2 Claims. (Cl. 260—683.15)

This invention relates to a process for the polymerization of propylene and more particularly to a process wherein the polymerization is effected by contacting the olefinic feedstock with a solid or liquid polymerization catalyst while recycling a propylene-rich fraction separated by fractionation of the effluent from the polymerization reaction zone and withdrawing a propane-rich fraction of very low propylene content.

While various processes have been developed and used in the polymerization of olefins, those that have gained commercial prominence in recent years are processes using solid phosphoric acid-type catalysts. In one of these processes, the olefinic gases are passed at reaction conditions through a catalyst bed of non-porous, inert, solid particles having a thin film of concentrated phosphoric acid disposed on the surface thereof. The particle sizes of the inert support, usually quartz, which are best suited for this polymerization process are set forth in U.S. Patent 2,579,433 to Holm and Langlois. In another such process, a solid phosphoric acid catalyst of the type described in U.S. Patent 1,993,513 has been used. In the latter process, an olefin-containing gaseous hydrocarbon mixture is passed through one or more beds of granular material made by mixing phosphoric acid with a relatively inert and generally siliceous material to produce a paste which is either calcined to produce a cake that is ground and sized or extruded to produce particles that are later calcined. In either case, the degree of hydration of the acid, and hence catalytic activity of the solid catalyst, is controlled during polymerization by adjustment of the partial pressure of water vapor in the reactant stream.

In prior catalytic processes, it has been necessary to obtain a relatively high degree of conversion of olefin to polymer. Such high conversion has been required because the effluent from the reactor has passed to a de-ethanizer and then to a stabilizer or depropanizer to provide an overhead recycle stream to the reactor. In such case, the propylene concentration in the propane fraction withdrawn from the polymerization system has been the same as that in the recycle stream and, in order to obtain a high overall conversion at reasonable recycle rates, it has been necessary to maintain the once-through conversion or conversion per pass relatively high. This is obviously due to the fact that any propylene appearing in the discarded propane fraction would be lost insofar as polymer production is concerned. Also, as the conversion per pass has decreased with the age of the catalyst, the propylene concentration in the discarded propane fraction has increased thereby causing a decline in the overall conversion.

The present invention overcomes these problems by providing for the separation of propylene from the propane fraction derived from the reaction effluent from the polymerization zone. In this way, a propylene-rich fraction is recycled to the polymerization zone at an olefin concentration wholly independent of its concentration in the propane fraction withdrawn from the polymerization system.

Accordingly, it is an object of this invention to provide a method wherein the conversion per pass in the catalytic polymerization of propylene may be varied over a wide range with no appreciable effect on the overall conversion.

Still another object is to provide an improved process for polymerizing propylene with the aid of a polymerization catalyst under relatively mild operating conditions while achieving a high overall conversion of the propylene.

These and other objects and advantages of the invention will become apparent from the description which follows, reference being made to the appended drawing which illustrates an embodiment of the invention wherein ethane is removed from the propylene feedstock before it enters the polymerization reaction zone, and propylene and propane fractions are separated from the reaction effluent so that a high overall conversion of propylene is achieved through the selective recycling of unconsumed propylene.

Basically, the invention involves a first fractionation of the reaction effluent from the polymerization reaction zone to recover polymer product substantially free of propane, propylene and lighter hydrocarbons and a second fractionation of only a portion of the overhead fraction of the first fractionation of the reaction effluent to yield a purge propane fraction of very low propylene content. The second fractionation is performed on only that portion of the overhead fraction of the first fractionation as will permit the purging of propane from the polymerization system at substantially the same rate at which propane enters the system with the propylene feedstock.

Referring to the flowsheet of the accompanying drawing, a proplyene feedstock, usually having a propylene content in the range of 15 to 80% by volume, is supplied through line 10 into which recycled propylene flows from lines 11 and 12, drawing the overhead fractions from gasoline stabilizer 13 and depropylenizer 14, respectively. The combined stream passes through line 10 into de-ethanizer 15 wherein ethane, ethylene and methane present in the feedstock are separated and withdrawn as an overhead fraction through line 16. The combined stream, thus stripped of hydrocarbons lighter than propane and propylene, passes from de-ethanizer 15 through line 17 and heat exchanger 18 which warms the stream prior to its entry into polymerization reactor 19.

Polymerization may be carried out in reactor 19 under conditions of temperature, pressure and space velocity set forth in U.S. Patent 2,579,433, that is, at a temperature between 150 and 500° F., at a pressure between 110 and 2000 p.s.i.g. (pounds per square inch gauge) and at a space velocity between 0.1 and 6 volumes of liquid feed per volume of catalyst per hour. Preferably, the initial portion of the reaction zone is maintained at a temperature between 300 and 400° F., while the terminal portion of the reaction zone is at a temperature between 350 and 450° F. The preferred pressure range is 300 to 1000 p.s.i.g.

To control the reaction temperature in reactor 19, a relatively cool recycle stream passes through line 20 and is injected through lines 20a, b, c and d into reactor 19 at spaced levels therein to quench the exothermic polymerization. The reaction effluent discharges from reactor 19 through line 21 into stabilizer 13 wherein the effluent is fractionated to yield a bottom fraction or product of polymer gasoline substantially free of propane and propylene, and an overhead fraction consisting essentially of propane, propylene and lighter hydrocarbons. Gasoline product is withdrawn from stabilizer 13 through line 22, while the overhead fraction flows from stabilizer 13 to line 11. The major portion of this overhead fraction provides the recycle stream which in part is mixed with the feedstock flowing through line 10 into de-ethanizer 15 and in part is injected at spaced levels into reactor 19 by way of line 20. Still another part of this recycle stream may flow through line 23 into the feed stream as it passes through line 17 into heat exchanger 18. Where the feedstock entering de-ethanizer 15 is stripped of ethane and ethylene so that only very little quantities of these hydrocarbons remain in the feedstock, the recycle stream in line 11 may have such a low content of ethane and ethylene that all of the recycle stream may be diverted from line 11 into lines 20 and 23.

A minor portion of the overhead fraction leaving stabilizer 13 passes through line 24 into depropylenizer 14 wherein propylene is stripped from propane so that a bottom fraction of very little or no propylene content is discharged through line 25. A propylene-rich overhead fraction flows from depropylenizer 14 through line 26 and thence either through line 12 discharging into the feedstock stream passing through line 10 or, if ethane and ethylene have been substantially eliminated from the feedstock, through line 27 into the feed stream passing through line 17.

The operating conditions in the de-ethanizer and depropylenizer are variable within limits which will result in the efficient separation of, respectively, an overhead fraction having a relatively high concentration of ethane, and a bottom fraction of propane substantially free of propylene. For example, the de-ethanizer may be maintained between about 400 and 500 p.s.i.g. wherein the overhead is removed at a temperature of about 60° to 130° F., and the bottoms between 180° and 200° F. The depropylenizer may operate at an overhead temperature of about 130° F. and a bottoms temperature of 137° F. at a pressure of about 285 p.s.i.g. The volume ratio of propylene-rich recycle to fresh feed will ordinarily be between about 0.5 to 1 and 3 to 1 and preferably between 1.5 to 1 and 2.5 to 1.

By means of the present invention, the conversion of propylene per pass in the reaction zone may be maintained between about 30 and 70%, preferably between 35 and 50%, with the recycling of the propylene-rich fraction providing a high overall conversion to polymer gasoline, preferably between 90 and 98%.

The normally gaseous olefinic feedstocks preferably used in the process of this invention will comprise on a volume basis about 10 to 20% methane, ethylene and ethane, 50 to 70% propylene, and 20 to 35% propane along with minor amounts of heavier hydrocarbons. The preferred phosphoric acid catalyst of the film type and the method of preparation thereof are adequately described in the copending application of E. T. Layng, Serial No. 484,061, filed January 25, 1955, now U.S. Patent No. 2,909,580.

For a fuller understanding of the invention, an illustrative example will now be given in detail.

A feed stock containing, on volume basis, 58.3% propylene, 32.3% propane, 1.7% ethylene, and 7.7% ethane is supplied at the rate of 15,880 barrels per day to de-ethanizer 15. Before entering the de-ethanizer, a propylene-rich recycle fraction obtained as the overhead from depropylenizer 14 is added to the feed stream at the rate of 6,100 barrels per day. The de-ethanizer is operated at a pressure of 500 p.s.i.g. with an overhead temperature of 125° F. and a bottoms temperature of 180° F. The overhead ethane-containing fraction is removed at the rate of 2,270 barrels per day. The bottoms fraction is then combined with another propylene-rich recycle fraction taken as overhead from gasoline stabilizer 13. The latter recycle fraction is supplied at the rate of 10,900 barrels per day. The feedstock together with the recycle fractions is heated to a temperature of 360° F. and introduced into polymerization reactor 19 maintained at a pressure of 435 p.s.i.g. and filled with phosphoric acid film catalyst of the type disclosed in the aforesaid application of Layng.

Under these conditions, the conversion per pass in the polymerization zone is about 35%. Still another propylene-rich recycle fraction which is not preheated is supplied at spaced levels in reactor 19 at the rate of 16,600 barrels per day. This spaced introduction of a recycle fraction without preheating cools the reaction zone and thus controls the exothermicity of the polymerization process.

The polymerization effluent leaves reactor 19 at a temperature of about 400° F. and a pressure of 400 p.s.i.g. and flows to stabilizer 13. The stabilizer is maintained at a pressure of 270 p.s.i.g. with an overhead temperature of 130° F. and a bottoms temperature of 475° F. An overhead propylene-rich fraction is returned at the rate of 27,500 barrels per day to be combined with the feedstock, as previously mentioned, partly after the feedstock has passed through the de-ethanizer and partly as the quenching medium injected at spaced levels in the reaction zone at a relatively cool temperature below the overhead temperature of the stabilizer. Polymer gasoline is removed from the bottom of the stabilizer at the rate of 5,690 barrels per day.

Part of the overhead from the stabilizer is fed to depropylenizer 14 which is maintained at an overhead temperature of 127° F., a bottoms temperature of 133° F. and a pressure of 270 p.s.i.g. The bottoms fraction from the depropylenizer is propane substantially free of propylene is removed at the rate 5,500 barrels per day.

Various modifications of the invention will occur to those skilled in the art upon consideration of the foregoing disclosure. Accordingly, only such limitations should be imposed as are indicated by the appended claims.

What is claimed is:

1. In the process for the catalytic polymerization of propylene wherein a normally gaseous mixture containing propylene, propane and not more than minor amounts of hydrocarbons heavier than propane, the propylene content being at least 15% by volume of said mixture, contacts a polymerization catalyst disposed in a reaction zone, the improvement which comprises fractionating the effluent from said reaction zone to recover therefrom a polymer product fraction substantially free of propane and propylene and an overhead effluent, recycling a major portion of the thus fractionated overhead effluent to said reaction zone, further fractionating the remainder of said overhead effluent not recycled to said reaction zone into a propylene-enriched recycle fraction and a discard fraction comprising predominantly propane and substantially free of propylene, and returning said propylene-enriched recycle fraction to said reaction zone, said propylene-enriched recycle fraction being in the range of 0.5 to 3.0 times the amount of the fresh feed to said reaction zone.

2. The process of claim 1 wherein the gaseous mixture includes ethane and said mixture is fractionated to remove the ethane therefrom and the propylene-enriched fraction is in part recycled to the feed to the ethane fractionation step.

References Cited in the file of this patent

UNITED STATES PATENTS

| | | |
|---|---|---|
| 2,404,340 | Zimmerman | July 16, 1946 |
| 2,460,303 | McAllister et al. | Feb. 1, 1949 |
| 2,493,454 | Hagy | Jan. 3, 1950 |
| 2,726,231 | Field et al. | Dec. 6, 1955 |
| 2,827,444 | Cines | Mar. 18, 1958 |
| 2,827,500 | Bloecher et al. | Mar. 18, 1958 |